(12) United States Patent
Wilson et al.

(10) Patent No.: US 7,594,060 B2
(45) Date of Patent: Sep. 22, 2009

(54) DATA BUFFER ALLOCATION IN A NON-BLOCKING DATA SERVICES PLATFORM USING INPUT/OUTPUT SWITCHING FABRIC

(75) Inventors: Andrew W. Wilson, Fremont, CA (US); John Acton, Danville, CA (US); Charles Binford, Wichita, KS (US); Daniel R. Cassiday, Topsfield, MA (US); Raymond J. Lanza, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 382 days.

(21) Appl. No.: 11/466,726

(22) Filed: Aug. 23, 2006

(65) Prior Publication Data
US 2008/0052432 A1 Feb. 28, 2008

(51) Int. Cl.
*G06F 13/00* (2006.01)
(52) U.S. Cl. ............ 710/316; 710/305; 710/306; 710/317; 712/225; 712/11
(58) Field of Classification Search ......... 710/316–317, 710/305–306; 712/225, 11
See application file for complete search history.

(56) References Cited

U.S. PATENT DOCUMENTS

| 5,841,775 | A | 11/1998 | Huang |
| 6,631,436 | B1 | 10/2003 | Liu et al. |
| 7,046,668 | B2 | 5/2006 | Pettey et al. |
| 7,058,738 | B2 | 6/2006 | Stufflebeam, Jr. |
| 7,088,727 | B1 | 8/2006 | Short et al. |
| 7,395,367 | B2 * | 7/2008 | Boyd et al. ........... 710/316 |
| 2005/0117578 | A1 | 6/2005 | Stewart et al. |
| 2007/0198763 | A1 | 8/2007 | Suzuki et al. |

OTHER PUBLICATIONS

Kazmi, Akber, "PCI Express and Non-Transparent Bridging Support High Availability," Nov. 20, 2004, Embedded Computing Design, http://web.archive.org/web/20041120123502/http://www.embedded-computing.com/articles/kazmi/.

* cited by examiner

*Primary Examiner*—Clifford H Knoll
*Assistant Examiner*—Kim T Huynh
(74) *Attorney, Agent, or Firm*—Kent A. Lembke; Libby A. Huskey; Marsh Fischmann & Breyfogle LLP

(57) ABSTRACT

Data buffering allocation in a microprocessor complex for a request of memory allocation is supported through a remote buffer batch allocation protocol. The separation of control and data placement allows simultaneous maximization of microprocessor complex load sharing, and minimization of inter-processor signaling/metadata migration. Separating processing control from data placement allows the location of data buffering to be chosen so as to maximize bus bandwidth utilization and achieve non-blocking switch behavior. This separation reduces the need for inter-processor communication and associated interrupts thus improving computation efficiency and performance.

20 Claims, 6 Drawing Sheets

DATA BUFFER ALLOCATION IN A NON-BLOCKING DATA SERVICES PLATFORM USING INPUT/OUTPUT SWITCHING FABRIC

RELATED APPLICATIONS

The present application relates to U.S. patent application Ser. No. 11/466,729 filed on Aug. 23, 2006 entitled, "Input/Output Routers With Dual Internal Ports" and U.S. patent application Ser. No. 11/466,734 filed on Aug. 23, 2006 entitled, "Cross-Coupled Peripheral Component Interconnect Express Switch". The entirety of both applications is hereby incorporated by this reference.

BACKGROUND OF THE INVENTION

1. Field of the Invention

Embodiments of the present invention relate, in general, to allocation of data buffer memory and more particularly to a non-blocking switching fabric with efficient allocation of data buffer memory from remote memory independent of the location of control processing.

2. Relevant Background

Typical current computer system configurations consist of one or more microprocessor and Input/Output ("I/O") complexes connected, through internal high speed busses. This connection occurs via I/O adapter cards, commonly termed Host Bus Adapters (HBAs) or Network Interface Cards (NICs). Examples of I/O busses that can be used to connect the microprocessor complex to HBAs and NICs are Infini-Band and Peripheral Component Interconnect ("PCIe") switches, as shown in prior art FIG. 1.

Microprocessor complexes in many such systems provide several I/O busses (devices) that may either be connected directly to an HBA or connected to several HBAs through an I/O switch. As illustrated in FIG. 1, an I/O switch 110 forms a tree of devices owned by one microprocessor complex 120 at the root of the tree. The microprocessor complex 120 of FIG. 1 is connected directly to a single HBA 130 as well as the switch 110 which is in turn coupled to two other HBA devices 140, 150 and a NIC 160, the NIC 160 providing access to a network 170. Two arrays 180, 190 are connected to the microprocessor complex 120 via the PCIe switch 110/HBA 150 path or directly through a single HBA 130. Currently, no mechanism exists with standard PCI devices and switches to share an I/O device with multiple microprocessor complexes.

As many computer systems, and the storage devices connected to them, are expected to maintain a very high state of availability, it is typically expected that the systems continue to run even when a component fails. The current approach to achieving high availability is to provide redundant components and paths. For example, a system may have two microprocessor complexes, each of which can access all of the I/O devices. Should one of the microprocessors fail, the other can continue processing, allowing the applications to continue running albeit at a decreased level of performance.

Within a storage appliance, it remains necessary to have at least two independent storage processors in order to achieve high availability. In FIG. 2, two such independent storage processors 230, 240 are shown, as is known in the prior art, with two separate instances of an operating system, one running on each processor 230, 240. There is also a pair of inter-processor links 280 that provide communication between the two processors 230, 240 and can optionally include switches 290 and additional links to other storage processors for capacity expansion. These links can be Ethernet, InfiniBand or of other proprietary designs. The system shown in FIG. 2 allows each host 210, 220 equal access to each array 250, 260, 270 via one or both of the storage processors 230, 240, as depicted by the lines L1 through L9.

For a number of reasons many of the offered I/O requests and associated data may have to be processed by the two or more storage processors 230, 240 necessitating travel of data across the inter-processor links 280. This can occur with larger configurations because a given host 210, 220 and array 250, 260, 270 may not be connected to the same set of storage processors 230, 240. Even when they are, the direct link may be a secondary one, and hence, the requests will still have to travel across an inter-processor link 280. Additionally, some applications frequently modify and reference data states that can be difficult and expensive to distribute between storage processors. In such cases, only a standby copy exists on other storage processors, and all requests that need that application must be forwarded over the inter-processor links to the active application instance. Requests that must visit two or more storage processors encounter additional forwarding delays, require buffer allocation in each storage processor, and can use substantial inter-processor link bandwidth.

Storage Networking protocols, such as Fibre-Channel and others as known in the prior art, allow a number of hosts to share a number of storage devices, thus increasing configuration flexibility and potentially lowering system cost. However, in such systems intelligent switches are needed to allocate the shared storage between the hosts and allow efficient transfer of data between any storage device 370 and any host. In FIG. 3, such a switch is shown that includes an I/O switching fabric to provide full connectivity, microprocessor complexes to perform data service operations, and Host-Bus Adapters 350 to interface to the Fibre-Channel network. Such an I/O switching fabric 340 allows data to be sent between any of the HBAs and any microprocessor complexes 310, 320, and could be of any appropriate type, such as InfiniBand, PCI express, or Ethernet. One exemplary switching fabric is described in co-pending U.S. patent application Ser. No. 11/466,734 entitled "Cross-Coupled Peripheral Component Interconnect Express Switch," the entirety of which is incorporated herein by this reference. The combination of HBAs, I/O switching Fabric, and microprocessor complexes forms an intelligent data switching system and can provide data routing and transformation services to the connected hosts.

In constructing such an I/O switch, it is desirable to minimize the costs while maximizing achieved bandwidth. Cost can be minimized by maintaining a constant cross-sectional bandwidth in the switch interconnection network as is illustrated in the example shown in FIG. 3. In FIG. 3, eight HBAs 350 each connect to the switch through a link with one unit of bandwidth (1B), while each of the two microprocessor complexes 310, 320 connects to the switch through a link with four units of bandwidth (4B). The cross-sectional bandwidth between the HBAs 350 and the switching fabric 340, and between the switching fabric 340 and the microprocessor complexes 310, 320 sums to 8B meeting the constant cross-sectional bandwidth criterion.

To maximize performance of switching fabric 340 such as illustrated in FIG. 3, it is necessary to distribute data traffic and data services operations evenly between the two (or more) microprocessor complexes 310, 320. For data traffic, full switch bandwidth is only achieved if all paths are equally utilized. Consider the following examples. For instance, should all the data traffic happen to move through microprocessor complex one 310, the switch to processor link would be oversubscribed and the delivered bandwidth to microprocessor complex one 310 could be cut in half regardless of the capability of microprocessor one 310. Similarly, if data service requests preferentially flow to microprocessor complex one 310, data service processing may be limited by the available computing power in the complex. In both cases distributing the data flow and data processing services evenly between the two microprocessor complexes 310, 320 allows the highest possible performance of the system.

A non-blocking of buffer allocation between processor-memory modules is lacking yet is necessary to achieve balanced data flow and to assist in the balancing of data processing. Mechanisms to evenly distribute data movement between a plurality of microprocessor complexes, to allow assignment of data services enabling processing of data independent of the buffering and transfer of the associated data, and to efficiently allocate buffering for the data, can achieve that balance.

SUMMARY OF THE INVENTION

Briefly stated, embodiments of the present invention describe a non-blocking switching fabric with efficient allocation of data buffer memory from remote memory among a set of microprocessor memory modules independent of the location of control processing.

Efficient random data buffering allocation in a microprocessor complex for a request of memory allocation is supported through a remote buffer batch allocation protocol. The separation of control and data placement allows simultaneous maximization of microprocessor complex load sharing and minimization of inter-processor signaling and metadata migration. Separating processing control from data placement allows the location of data buffering to be chosen so as to maximize bus bandwidth utilization and achieve non-blocking switch behavior. These aspects reduce the need for inter-processor communication, memory to memory data movement, and associated interrupts improving computation efficiency and performance.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein:

DETAILED DESCRIPTION OF THE PREFERRED EMBODIMENTS

Figure 1:
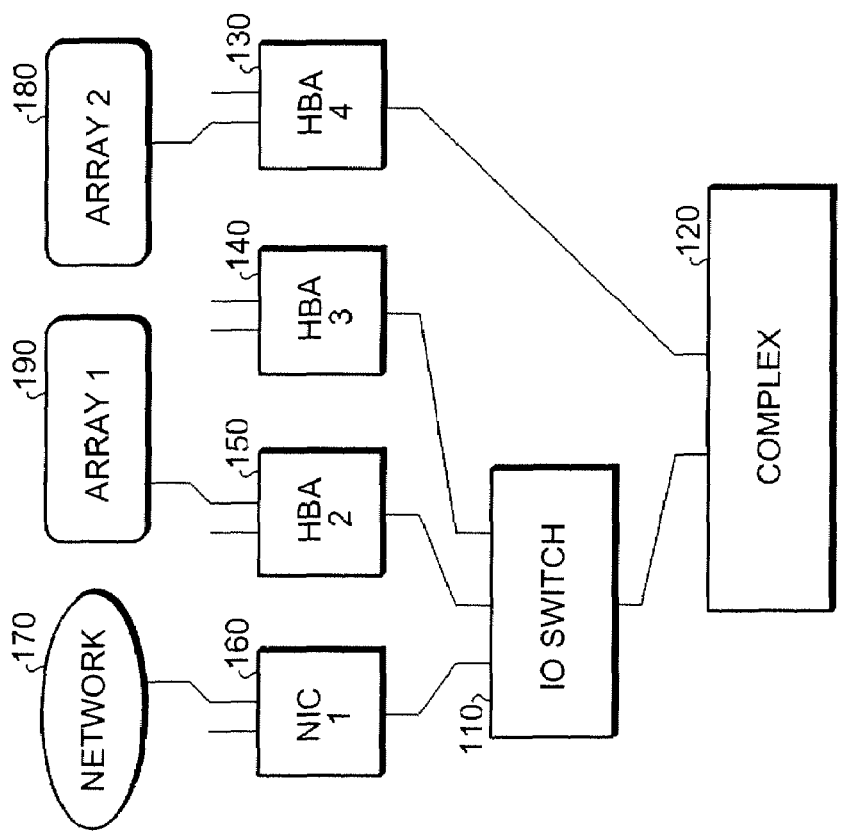
FIG. 1 shows a simple I/O switch interconnect tree as is known in the prior art.
Figure 2:
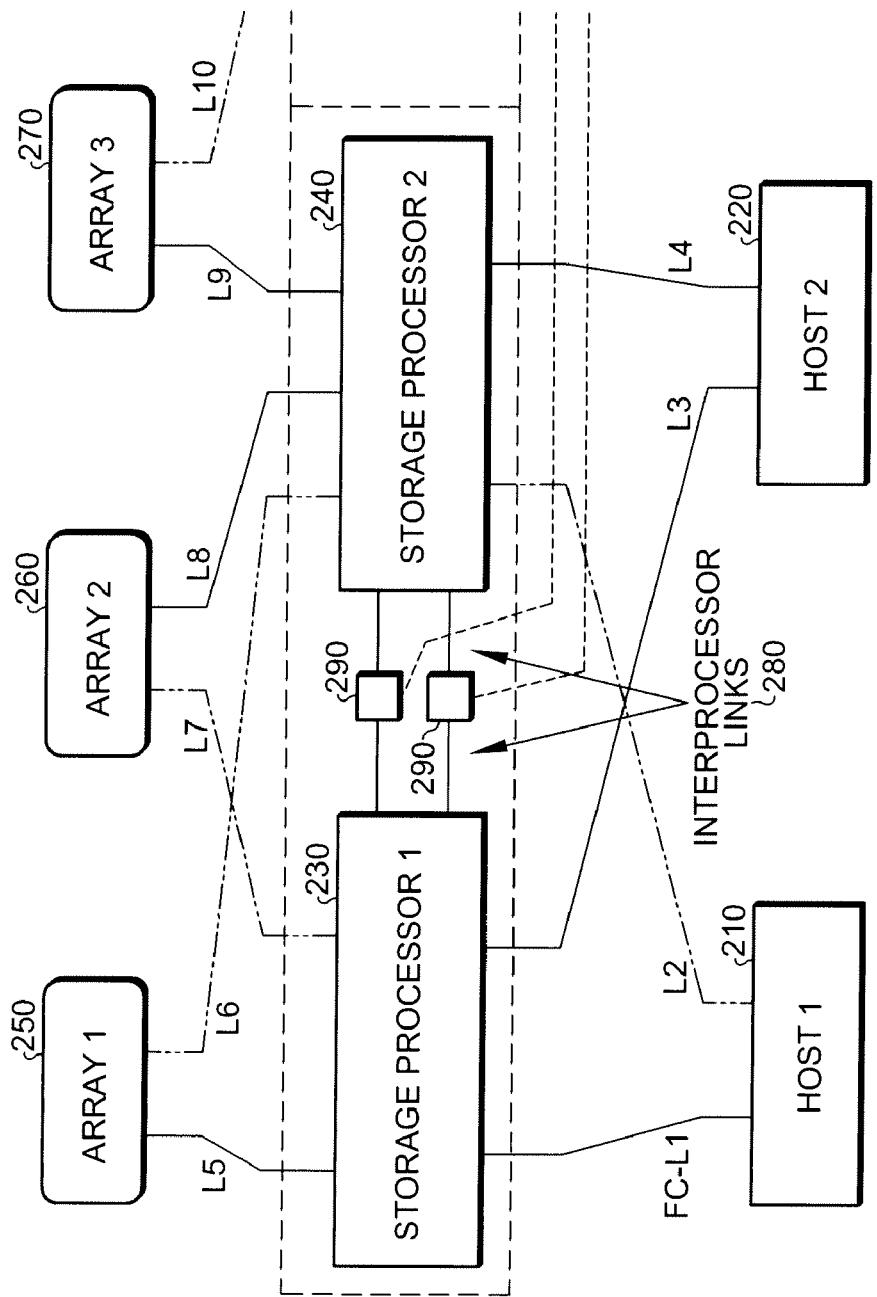
FIG. 2 shows storage processor appliance architecture as is known in the prior art.
Figure 3:
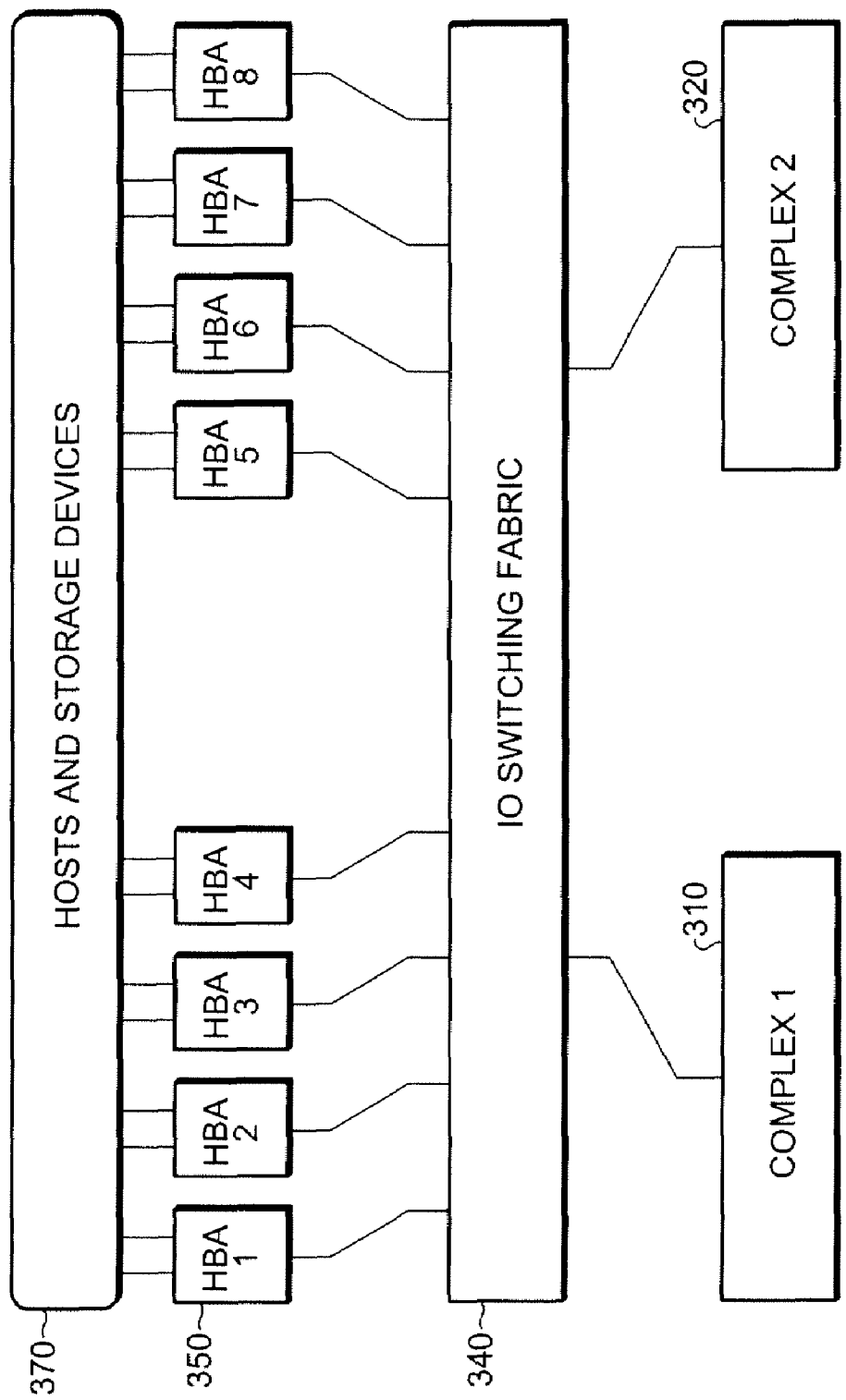
FIG. 3 is a high level block diagram for a system architecture for providing non-blocking data services using an I/O switching fabric, according to one embodiment of the present invention.

A non-blocking switching fabric with efficient and dynamic allocation of data buffer memory from remote memory, independent of the location of control processing, allows simultaneous maximization of microprocessor complex load sharing and minimizes inter-processor signaling and metadata migration. According to one embodiment of the present invention, performance of the switching fabric is maximized by distributing data traffic and data services operations evenly between the two or more microprocessor complexes. In the configuration presented in FIG. 3, and in accordance, with one embodiment of the present invention, half of the traffic is channeled through one microprocessor 310 and half through the other microprocessor 320. As the number of microprocessors grow, so too does the division of traffic. Data transfers to or from any HBA 350 may use either microprocessor complex 310, 320, so as to equalize bandwidth utilization, which in one embodiment is the product of average request size and number of requests, and not just the number of requests by itself.

According to one embodiment of the present invention, mechanisms evenly distribute data movement between a plurality of the microprocessor complexes, allowing the assignment of data service processing independent of the buffering and transfer of the associated data.

To create substantially optimal traffic flow, a non-blocking switching fabric is created that randomly distributes alternative data routes. In a storage switch, according to one embodiment of the present invention, data being transferred between hosts and storage devices needs to be temporarily stored in the memory of one of the microprocessor complexes. Hence the amount of data destined to travel over a link at a given time is proportional to the amount of space allocated for buffering in the associated microprocessor complex at that time. One embodiment of the present invention is to allocate buffering for each request to a randomly selected microprocessor complex. Accordingly, the data traffic routing will also be uniformly random, achieving non-blocking properties. By using an I/O switching fabric any HBA may send data to any and receive data from any microprocessor complex, allowing the random assignment of buffers.

Traditional storage protocols, such as SCSI, Fibre-Channel and iSCSI combine the transfer of data with the control information. For example, a parallel SCSI transaction consists of a Control Data Block (CDB) and the data itself. The CDB contains information needed to place the data. Thus, in a typical storage system, data and control move together using known protocols. In one embodiment of the present invention, the transfer and the control processing are separated.

In a storage system, operations such as file to block mapping or Logical Unit Number "LUN" to volume mapping are generally limited to examination and modification of the data control information. Thus, the associated data can be placed wherever it is necessary for latency minimization and/or uniform bus bandwidth utilization. Significantly, the control processing can be done wherever it is most efficient. The allocation of such processing can, according to one embodiment, be based on optimizing processor utilization or minimizing state transfer. The process by which control of the data and the data itself are separated is enabled, according to one embodiment of the present invention, by using an internal protocol that passes data control information along with global data buffer location information, allowing actual data movement to be minimized.

According to another embodiment of the present invention, a global addressing mechanism identifies both the microprocessor complex in which the data is stored and the data's location within the microprocessor complex itself. The data control information that is passed among the control software in the system is modified to include these global addresses. The global addresses therefore contain information to identify the microprocessor complex containing the data, as well as the memory locations within the complex which the data occupies. Thus, the data's location can be uniquely identified regardless of the location of the control processing.

Figure 4:
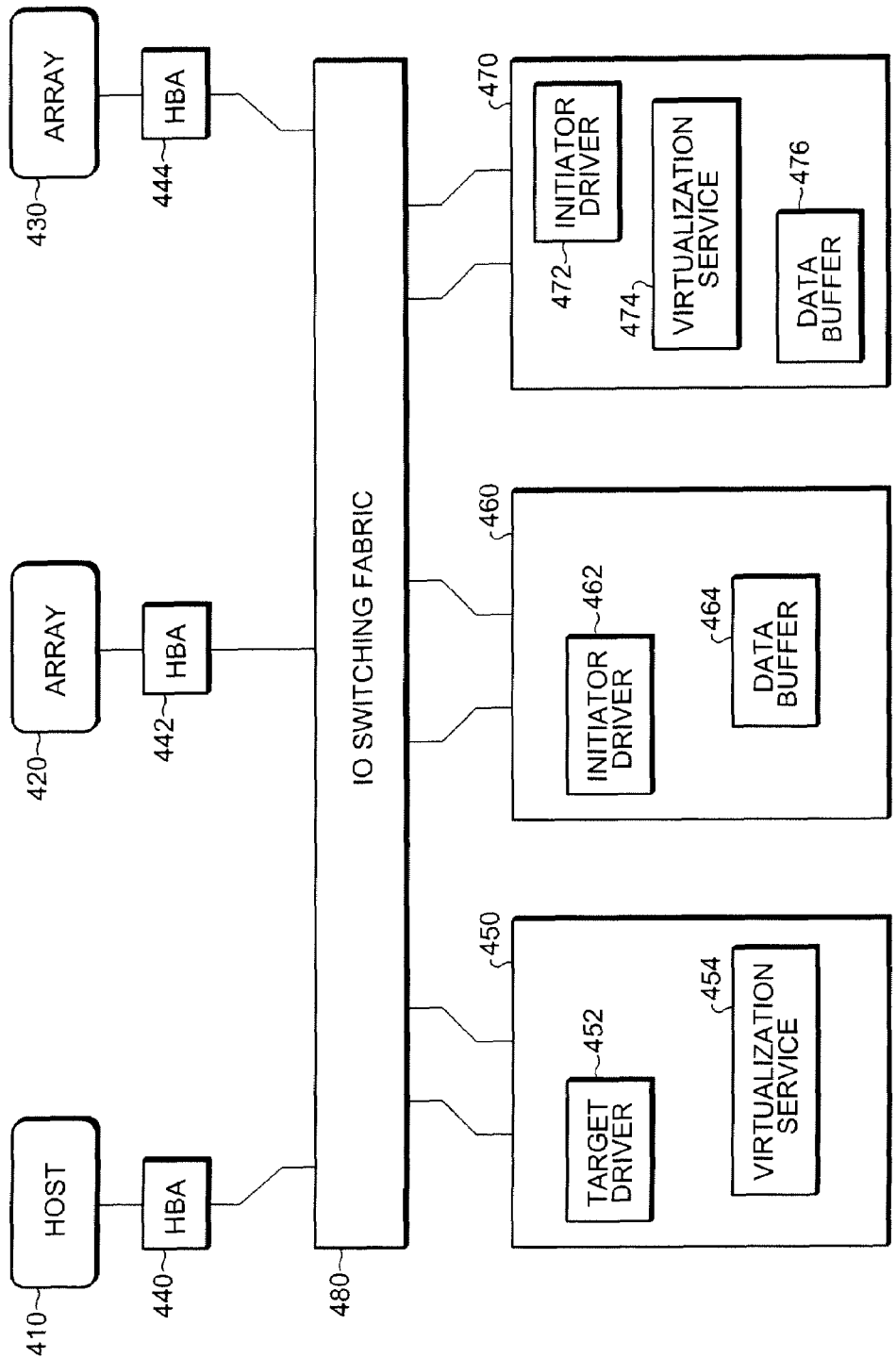
FIG. 4 is a high level block diagram for a system for separating data content from data control among a plurality of microprocessor complexes, according to one embodiment of the present invention.

FIG. 4 shows a high level block diagram of independent allocation of data buffers according to one embodiment of the present invention. The system illustrated in FIG. 4 includes I/O devices including a host 410, a first array 420 and a second array 430. Each I/O device is connected to the switching fabric via a HBA 440, 442, 444. Finally, three microprocessor complexes 450, 460, 470 are connected to the switching fabric. The number and type of components depicted in FIG. 4 is not a limiting aspect of the present invention. Indeed more or less components can be incorporated to the present invention without departing from the invention's scope and intent. In this embodiment of the present invention, one microprocessor complex 450 includes a target driver 452 and a virtualization service 454. As the term is used herein, "virtualization services" refers to SCSI block services, as well as Network File Services. Both can be supported well by the architecture of the present invention. The middle microprocessor complex 460 comprises an initiator driver 462 and a data buffer 464 and the final microprocessor complex 470 comprises an initiator driver 472, a data buffer 476 and a virtualization service 474. In other embodiments, each microprocessor complex 450, 460, 470 may comprise all of the above components. For illustrative purposes, only select components in each microprocessor complex are depicted.

Assume for demonstrative purposes that two I/O data requests originate from a host 410. Each request possesses a data component and a control component. Each of the three indicated microprocessor complexes 450, 460, 470 controls an HBA 440, 442, 444 respectively. The host 410 is connected to the left most HBA 440 which is owned by the left most microprocessor complex 450. Hence, requests arriving from the host 410 are processed by a target driver 452 on that complex 450. According to one embodiment of the present invention, data buffers 464, 476 are allocated so as to minimize switch and link congestion, which in this exemplary embodiment, results in a data buffer associated from one of the requests of the host 410 being allocated from memory in the middle microprocessor complex 460 and the other request from the host 410 being allocated in the right microprocessor complex 470. In this embodiment of the present invention, control processing is being conducted by the left most microprocessor 450 while the data buffers are allocated to other microprocessor complexes 460, 470.

While data buffers are allocated so as to minimize link and switch congestion, the location of control processing is determined by completely different constraints. With standard operating systems the target driver 452 and initiator drivers 462, 472 would be placed on the processor complex that owns the associated HBAs, in this case the left most microprocessor complex 450. According to the prior art, the request from the host 410 would arrive to controlling microprocessor complex 450. The target driver 452 and the initiator driver (not shown) within that microprocessor complex 450 would process the request. However, according to one embodiment of the present invention, the virtualization services 454, 474 allow control processing to run on any processor complex 450, 460, 470 as appropriate so as to balance the load between the microprocessor complexes 450, 460, 470. For example, the first request from the host 410 may be received by the target driver 452 of the first microprocessor complex 450 and thereafter use that host's virtualization service 454 to access the initiator driver 462 of the middle microprocessor complex 460. Control information from the target driver 452 to the virtualization service 454 is, in one embodiment of the present invention, conveyed via a SCSI server. Other means of communicating such control are also contemplated and equally applicable to the present invention.

As will be appreciated by one skilled in the art, control information typically passes from an HBA to a virtualization service via a number of steps. Generally control information originating in a HBA is conveyed to a target mode driver in the owning operating system domain/microprocessor complex and is then passed to a SCSI server in the same complex to thereafter reside in a SCSI class driver stack. Transfer of control information continues through an internal fabric to a second operating system domain/microprocessor complex where it is directed to a SCSI class target driver and SCSI server instance found in the second microprocessor complex. Finally the control information arrives at the virtualization service in the second microprocessor complex. Meanwhile, data associated with the above mentioned control information flows from the same HBA to the first microprocessor complex through the actions of the SCSI server and the target mode driver of that microprocessor complex. Thereafter the data flows from the first to the second microprocessor complex through the internal fabric and through actions of the SCSI class drivers and the SCSI server instance on the second microprocessor complex.

According to one embodiment of the present invention, the passing of control information is simplified by using a Remote Procedure Call (RPC) mechanism in place of the SCSI class drivers and second use of a SCSI server. Using such a mechanism control information can be passed by using the SCSI server virtualization service on the first microprocessor complex and then calling directly to the additional virtualization service on the second microprocessor complex. Alternatively and according to another embodiment of the present invention, the target mode driver can determine what microprocessor complex to use, and go directly to the SCSI server on the second microprocessor complex. In yet another embodiment, intelligent HBAs (also referred to herein as I/O Routers), can send the control information directly to the second microprocessor complex where the SCSI server and virtualization service reside, without communicating with the first complex at all.

Referring back to FIG. 4, the second request may also be initially received by the target driver 452 of the first microprocessor complex 450 and thereafter access the virtualization services 474 of the rightmost microprocessor complex 470, so as to utilize the initiator driver 472 of that microprocessor complex 470. These choices could be due to processor load balancing considerations, or because a particular virtualization service is constrained to run on a particular processor complex. For example, the virtualization service used by either request may perform better when placed on the processor complex which owns the HBA used to access the array on which the data is ultimately stored.

The separation of control processing and data buffering is also illustrated in FIG. 4. The two requests generated by the host 410 also require allocation of memory buffers in microprocessor complexes 450, 460, 470. Typically these buffers are associated with the controlling microprocessor complex, in this case the leftmost microprocessor complex 450. According to one embodiment of the present invention, data buffers located in other microprocessor complexes 460, 470 not involved in the control processing can be utilized to store the data. Thus while the control processing for the requests may take place in the leftmost microprocessor 450, (or any other microprocessor complex through virtualization services) the data buffering may be allocated to memory resources in other microprocessor complexes 460, 470. Since each microprocessor complex 450, 460, 470 is a separate operating system (OS) domain, and memory allocation is generally under the control of the operating system domain that owns the memory, the normal approach would be for the operating system attempting to allocate a data buffer in remotely located memory to send a message to the other operating system domain to request allocation of that buffer. The remote operating system would, when able, do so, and thereafter send a global pointer back to the requesting operating system identifying the allocated memory locations. Sending such messages between operating system domains however is costly in terms of latency and processing, as they usually require interrupts at the receiving OS. This processing overhead and latency can severely impact performance.

One should note that in the aforementioned exemplary embodiment of the present invention, the HBA devices are assumed to be incapable of directing control information. The HBAs of the previous embodiment require driver code in a microprocessor complex to enable it to interpret the arriving SCSI request (or network files services if it is a NIC) and then pass the request on to a virtualization service, as described above. The present invention is also equally compatible with and is contemplated to be implemented with HBAs that can determine themselves what virtualization services are needed and thereafter send the control portion to the microprocessor complex on which that service is running. Simultaneously, this "intelligent" HBA can select a (possibly different) microprocessor complex to store the data. These intelligent HBAs are also referred to, in some cases, as I/O routers. Thus control can be passed to the appropriate microprocessor complex without first visiting the owning microprocessor.

Figure 5:
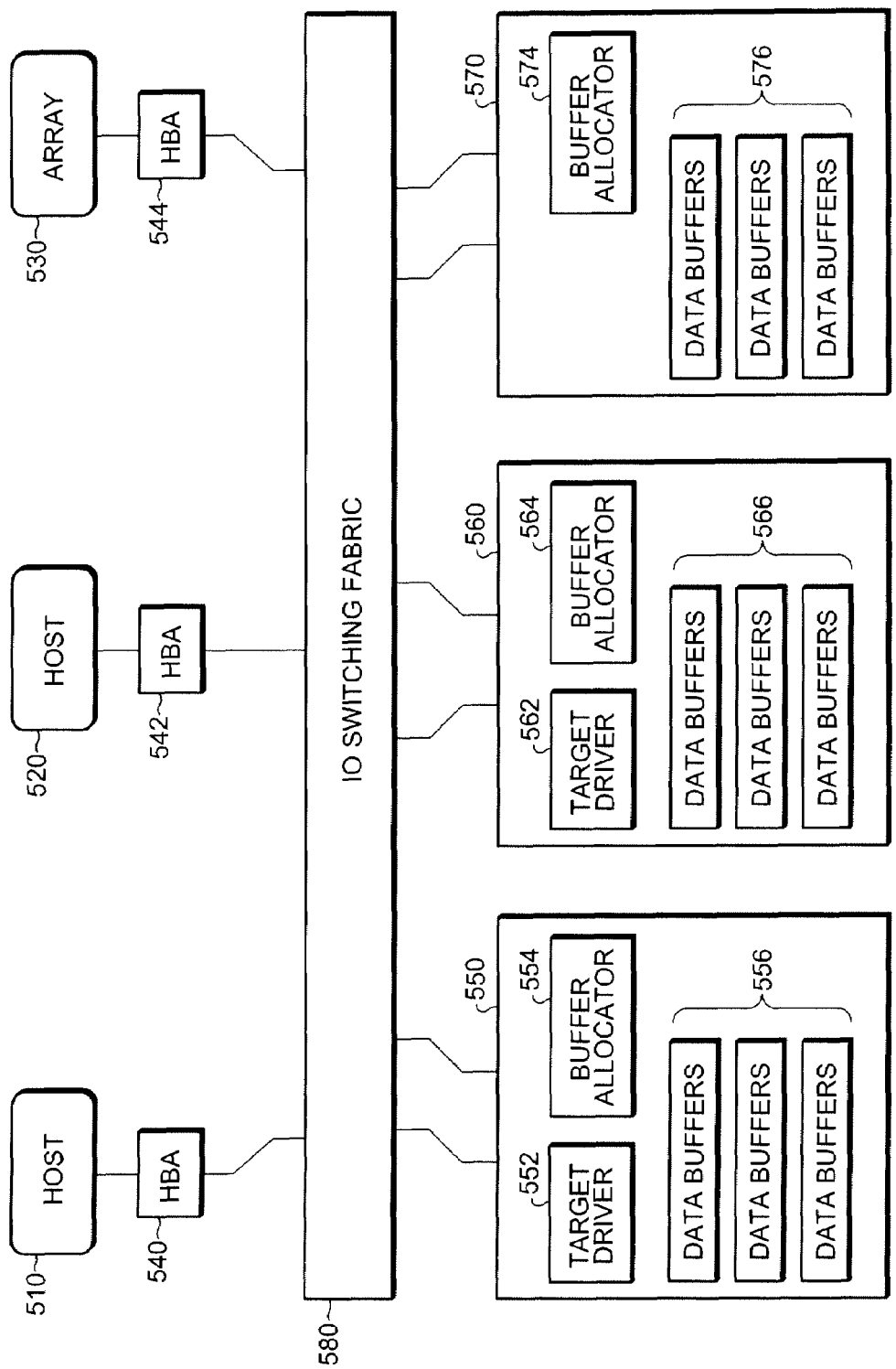
FIG. 5 is a high level block diagram of a system for allocation data buffers among a plurality of microprocessor complexes according to one embodiment of the present invention.

According to one embodiment of the present invention significant performance improvements can be achieved when each operating system domain is allowed to control a pool or batch of data buffers in each of the other operating system domains. FIG. 5 provides a high level block diagram of such a system for allocation of data buffers among a plurality of microprocessor complexes. As shown in FIG. 5, two hosts 510, 520 and an array 530 are coupled to a switching fabric 580 via HBAs 540, 542, 544 (respectively). Through the switching fabric 580, the hosts 510, 520 and the array 530 have for data movement equal access to all three microprocessor complexes 550, 560, 570. The microprocessor complexes 550, 560 associated with the hosts 510, 520 comprise a target driver 552, 562, a data buffer allocator 554, 564, and a plurality of data buffers 556, 566. The microprocessor complex 570 associated with the array 530 also possesses a data buffer allocator 574 and a plurality of data buffers 576. According to one embodiment of the present invention, data buffers located in each of the microprocessor complexes 550, 560, 570 are statically or dynamically placed under the control of operating system domains operating on other microprocessor complexes prior to the need for such allocation arising.

Such data buffer allocation avoids the frequent inter-processor communications necessary when buffers are allocated one at a time or on a case by case basis. In one embodiment of the present invention, the buffers can be statically allocated, or dynamically allocated in batches of buffers. For example, a static allocation for a three microprocessor complex 550, 560, 570 could permanently assign one third of each complex's buffer region 556, 566, 576 to each other operating system domain. While simple, this approach can waste space when buffer usage by the three operating system domains is not balanced. It does however reduce inter-processor communication regarding buffer allocation that can severely degrade performance. For example, when data buffers are statically allocated by an operating system domain associated with a microprocessor complex 550 that receives a request from a host 510, then only two of the three operating system domains associated with the microprocessor complexes 550, 560, 570 shown in FIG. 5 would be allocating such buffers. Hence the buffers assigned to the third, right most, domain 570 may, in some situations, be wasted.

According to another embodiment of the present invention, a data buffer allocator 554, 564, 574 running in each operating system domain associated with each microprocessor complex 550, 560, 570 requests a batch of buffers from its own and/or other operating system domains (microprocessor complexes) each time its supply for its domain runs low. Similarly, if it finds it is holding too many empty buffers, it returns some of the buffers previously allocated to be under its control. As indicated by the arrows in FIG. 5, the buffer allocators 554, 564, 574 each contain lists of buffer addresses under their control for each operating system domain. According to one embodiment of the present invention, when the number of empty buffers drops to a preset threshold for a particular operating system domain, that buffer allocator 554, 564, 574 requests a batch of buffers from that and other domains. Similarly, when the number of empty buffers under one particular operating system domain's control exceeds a second preset threshold, that particular operating system domain (microprocessor complex) returns one or more batches of buffers. This dynamic allocation of data buffers ensure that the operating system domain in the most need of data buffers can easily and efficiently gain control over them without detrimentally impacting microprocessor inter-communications.

In yet another embodiment of the present invention, a buffer allocation manager (not shown) queues requests when data buffers are not immediately available. The buffer allocation manager can identify and scavenge empty data buffers from other operating system domains that are unused but are yet not numerous enough to constitute a batch for the controlling operating system domain to return on its own Similarly, the buffer allocation manager can set thresholds upon which operating system domains must return the control of batches of unused data buffers. Furthermore, the buffer allocation manager can resolve any conflict that may exist between each individual microprocessor complex's buffer allocator. In one embodiment of the present invention, buffer allocators associated with each microprocessor complex would manage all free buffers in its own operating system domain, as well as keep lists of temporarily owned, remote data buffers. The allocator would be responsible for keeping track of the global address (microprocessor complex: local address) of each remote buffer of which it has temporary ownership while the buffer allocation manager would manage the global allocation of data buffers.

Note, that while the above described invention is framed in block storage terms, i.e. buffers, the present invention could also apply to a network file server. In such an embodiment, the HBA connected to a host would instead be a NIC coupled to a network, and one of the virtualization services would be a file system service. Indeed, as will be apparent to one skilled in the relevant art, the teachings of the present invention can be applied to numerous computer systems that require data equalization to achieve non-blocking behavior. In either case, the ability to separate buffering and routing decisions from control processing flow, combined with efficient remote buffer allocation, allows the random routing of file or block data which results in a non-blocking, highly efficient data services platform.

Figure 6:
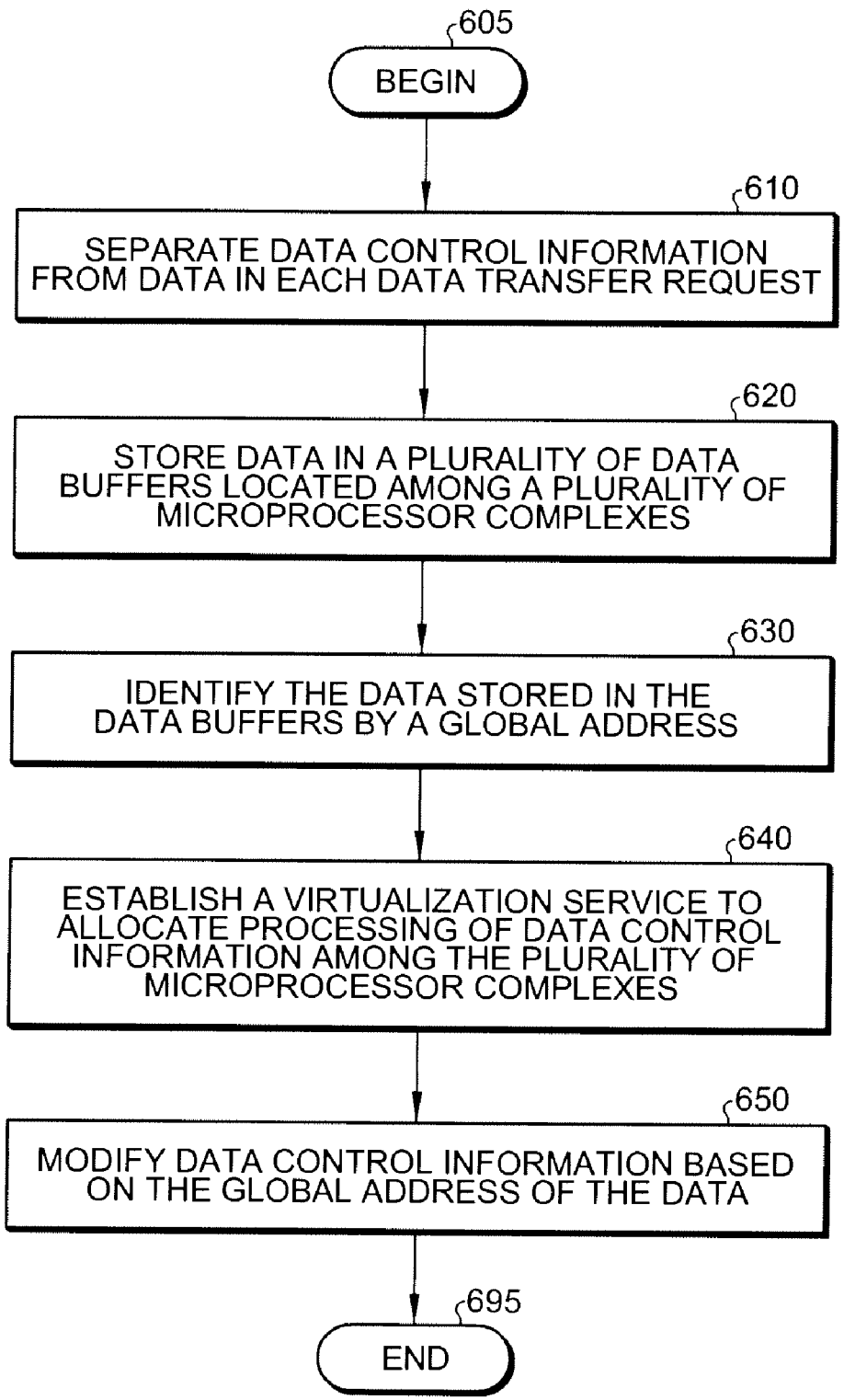
FIG. 6 is a flow chart of one method embodiment for separating data content from data control and allocation of data buffers among a plurality of microprocessor complexes according to one embodiment of the present invention.

FIG. 6 is a flow chart of one method embodiment for separating data content from data control and allocation of data buffers among a plurality of microprocessor complexes according to one embodiment of the present invention. According to one embodiment of the present invention a plurality of data transfers between one or more hosts and one or more storage devices can be balanced by separating data control information from the data itself. As each request for transfer contains both data control information and data, these two aspects are separated 610 and managed independently. The data portion of the request is stored 620 temporally in a plurality of data buffers. These data buffers are allocated among a plurality of microprocessor complexes. Once stored, the location of the data is identified 630 by a global address identifying both the specific microprocessor complex and the location within the microprocessor complex. Simultaneously, a virtualization service is established 640 to allocate the processing of the data control information among the plurality of microprocessor complexes. Note that the storage of the data and the allocation of processing of the data control information need not be at the same microprocessor complex. Finally the data control information is modified 650 with the global data address so as to be aware of the location of the data.

While there have been described above the principles of the present invention in conjunction with specific computer virtualization architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

As will be understood by those familiar with the art, the present invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer implemented method for balancing a plurality of data transfers between at least one host and at least one storage device coupled together via a switching fabric, wherein each data transfer comprises data control information and data, the method comprising:

separating from each data transfer, the data control information from the data;

storing the data temporarily in at least one of a plurality of shared microprocessor complexes, wherein the plurality of microprocessor complexes are each associated with a plurality of data buffers, the data being stored in at least one of the plurality of data buffers; and establishing a virtualization service on at least one of the plurality of shared microprocessor complexes, wherein the virtualization service allocates processing of data control information to at least one of the plurality of shared microprocessor complexes, wherein in at least a portion of the data transfers, the at least one microprocessor complex processing data control information and the at least one microprocessor complex temporarily storing the data are not the same microprocessor complex.

2. The computer implemented method of claim 1, further comprising identifying the data stored in the plurality of data buffers by a global address, wherein the global address identifies a specific microprocessor complex and a specific data buffer within the specific microprocessor complex.

3. The computer implemented method of claim 2, further comprising modifying data control information based on the global address of the data.

4. The computer implemented method of claim 1, wherein control of a portion of the plurality of data buffers on at least one microprocessor complex is allocated among the plurality of microprocessor complexes.

5. The computer implemented method of claim 4, wherein allocation of control of data buffers among the plurality of microprocessor complexes occurs in batches.

6. The computer implemented method of claim 4, wherein allocation of control of data buffers among the plurality of microprocessor complexes is static.

7. The computer implemented method of claim 4, wherein allocation of control of data buffers among the plurality of microprocessor complexes is dynamic.

8. The computer implemented method of claim 1, wherein allocating use of data buffers is done randomly among the plurality of microprocessor complexes.

9. The computer implemented method of claim 1, wherein allocation of processing of data control information among the plurality of microprocessor complexes is based on microprocessor utilization.

10. The computer implemented method of claim 1, wherein allocation of data control information among the plurality of microprocessor complexes is based on state transfer minimization.

11. The computer implemented method of claim 1, wherein the switching fabric comprises a plurality of peripheral component interconnect express switches cross-coupled via non-transparent ports.

12. A computer system for balancing a plurality of data transfers between at least one host and at least one storage device coupled together via a switching fabric, wherein each data transfer comprises data control information and data, the system comprising:

a software portion configured to connect each host and each storage device to a plurality of shared microprocessor complexes via a plurality of I/O adapters coupled with the switching fabric, wherein each of the I/O adapters is dedicated to one of the hosts or storage devices;

a software portion configured to separate from each data transfer data control information from the data;

a software portion configured to store the data temporarily in at least one of the plurality of shared microprocessor complexes, wherein the plurality of shared microprocessor complexes are each associated with a plurality of data buffers, the data being stored in at least one of the plurality of data buffers; and a software portion configured to establish a virtualization service on at least one of the plurality of shared microprocessor complexes, wherein the virtualization service allocates processing of data control information to at least one of the plurality of shared microprocessor complexes, wherein the at least one microprocessor complex processing data control information and the at least one microprocessor complex temporarily storing the data may or may not be the same microprocessor complex.

13. The computer system of claim 12, further comprising a software portion configured to identify the data stored in the plurality of data buffers by a global address, wherein the global address identifies a specific microprocessor complex and a specific data buffer within the specific microprocessor complex.

14. The computer system of claim 12, further comprising a software portion configured to modify data control information based on the global address of the data.

15. The computer system of claim 12, wherein control of a portion of the plurality of data buffers on at least one microprocessor complex is allocated among the plurality of microprocessor complexes.

16. The computer system of claim 15, wherein allocation of control of data buffers among the plurality of microprocessor complexes occurs in batches.

17. The computer system of claim 15, wherein allocation of control of data buffers among the plurality of microprocessor complexes is dynamic.

18. The computer system of claim 12, wherein the switching fabric comprises a plurality of peripheral component interconnect express switches cross-coupled via non-transparent ports.

19. At least one computer-readable medium containing a computer program product for balancing a plurality of data transfers between at least one host and at least one storage device coupled together via a switching fabric, wherein each data transfer comprises data control information and data, the system comprising:

a plurality of shared microprocessor complexes, wherein the plurality of shared microprocessor complexes are separate from and indirectly coupled to the at least one host and the at least one storage device;

program code for separating from each data transfer, data control information from the data;

program code for storing the data temporarily in the plurality of shared microprocessor complexes, wherein the plurality of shared microprocessor complexes are each associated with a plurality of data buffers, the data being stored in the plurality of data buffers; and program code for establishing a virtualization service on at least one of the plurality of microprocessor complexes, wherein the virtualization service allocates processing of data control information to at least one of the plurality of shared microprocessor complexes, wherein the at least one microprocessor complex processing data control information and the at least one microprocessor complex temporarily storing the data may or may not be the same microprocessor complex.

20. The at least one computer-readable medium of claim 19, further comprising program code for identifying the data stored in the plurality of data buffers by a global address, wherein the global address identifies a specific microprocessor complex and a specific data buffer within the specific microprocessor complex, and wherein control of a portion of the plurality of data buffers on at least one microprocessor complex is allocated among the microprocessor complex.

* * * * *